US006546757B1

United States Patent
Morse

(10) Patent No.: US 6,546,757 B1
(45) Date of Patent: Apr. 15, 2003

(54) LIQUID SPRAY PYROLYSIS METHOD FOR THE FABRICATION OF OPTICAL FIBER PREFORMS, WITH REACTANT MIXING

(75) Inventor: Theodore F. Morse, Providence, RI (US)

(73) Assignee: Brown University Research Foundation, Providence, RI (US)

( * ) Notice: Subject to any disclaimer, the term of this patent is extended or adjusted under 35 U.S.C. 154(b) by 0 days.

(21) Appl. No.: 09/776,046

(22) Filed: Feb. 2, 2001

Related U.S. Application Data

(62) Division of application No. 09/363,089, filed on Jul. 28, 1999, now abandoned.
(60) Provisional application No. 60/094,417, filed on Jul. 28, 1998.

(51) Int. Cl.[7] ............................................. C03B 37/027
(52) U.S. Cl. ............................ 65/377; 65/377; 65/413; 65/421
(58) Field of Search ..................... 65/413, 377, 421, 65/414, 415

(56) References Cited

U.S. PATENT DOCUMENTS

| | | | |
|---|---|---|---|
| 3,883,336 A | | 5/1975 | Randall |
| 4,184,860 A | * | 1/1980 | Schneider et al. .......... 385/123 |
| 4,220,460 A | * | 9/1980 | Partus ..................... 261/121.1 |
| 4,230,744 A | * | 10/1980 | Blankenship ................ 65/413 |
| 4,501,602 A | * | 2/1985 | Miller ....................... 65/18.2 |
| 4,557,561 A | | 12/1985 | Schneider et al. |
| 4,616,901 A | | 10/1986 | MacChesney et al. |
| 4,618,211 A | | 10/1986 | Fleury |
| 4,680,048 A | | 7/1987 | Motoki et al. |
| 4,749,395 A | | 6/1988 | Schneider |
| 5,043,002 A | | 8/1991 | Dobbins et al. |
| 5,078,092 A | | 1/1992 | Antos et al. |
| 5,110,335 A | | 5/1992 | Miller et al. |
| 5,114,738 A | * | 5/1992 | Savage et al. ........... 427/163.2 |
| 5,152,819 A | * | 10/1992 | Blackwell et al. .......... 423/336 |
| 5,236,481 A | | 8/1993 | Berkey |
| 5,356,451 A | | 10/1994 | Cain et al. |
| 5,979,185 A | * | 11/1999 | Blackwell et al. ........... 65/17.4 |
| 5,991,486 A | | 11/1999 | Braglia |
| 6,245,150 B1 | * | 6/2001 | Lyons ........................ 118/726 |
| 6,260,385 B1 | * | 7/2001 | Sempolinski et al. ........ 65/17.4 |

OTHER PUBLICATIONS

U.S. patent application Specification 08/767653—Dec. 17, 1996.*

* cited by examiner

Primary Examiner—John Hoffmann
(74) Attorney, Agent, or Firm—Harrington & Smith, LLP

(57) ABSTRACT

A method is disclosed for fabricating a preform suitable for use in manufacturing a wide bandwidth multi-mode optical fiber. The method includes steps of employing a liquid phase spray pyrolysis technique for generating silica soot at a high rate, in combination with a non-chlorine containing liquid silica precursor and a refractory, index of refraction raising additive that overcomes the problems inherent in the use of germanium-based chemistry at typical sintering temperatures. The refractory, index of refraction raising additive is preferably comprised of a Group VB element oxide, such as a tantalum oxide. The liquid precursor is preferably comprised of a polymethylsiloxane, such as hexamethyl di-siloxane, octamethylcyclotetrasiloxane (OMCCTS), or tetramethylcyclotetrasiloxane. The step of employing a liquid phase spray pyrolysis technique includes the steps of: (a) merging at least two liquid streams, one comprised of the liquid silica precursor and another one comprised of the liquid silica precursor in combination with the additive; (b) atomizing, spraying and then combusting the merged streams to form a flame that generates silica soot that contains the additive; and (c) varying the flow rate of at least one of the streams in order to vary a concentration of the additive in the silica soot.

14 Claims, 1 Drawing Sheet

Schematic of Parabolic Index Profile
for Graded Index Optical Fiber

LIQUID SPRAY PYROLYSIS METHOD FOR THE FABRICATION OF OPTICAL FIBER PREFORMS, WITH REACTANT MIXING

CROSS-REFERENCE TO RELATED APPLICATIONS

This application is a divisional of U.S. patent application Ser. No. 09/363,089, filed Jul. 28, 1999 abandoned.

CLAIM OF PRIORITY FROM A COPENDING PROVISIONAL PATENT APPLICATION

Priority is herewith claimed under 35 U.S.C. §119(e) from copending Provisional Patent Application 60/094,417, filed Jul. 28, 1998, entitled "Method and Apparatus for the Fabrication of Multi-Mode Optical Fiber Preforms", by Theodore F. Morse. The disclosure of this Provisional Patent Application is incorporated by reference herein in its entirety.

STATEMENT OF GOVERNMENT RIGHTS

This invention was made with government support under Contract/Grant Number 49620-96-1-0083 awarded by the Air Force Office of Sponsored Research. The government has certain rights in this invention.

FIELD OF THE INVENTION

This invention relates generally to optical fibers and, in particular, to methods for fabricating optical fiber preforms suitable for use as multi-mode optical fiber precursors.

BACKGROUND OF THE INVENTION

The fabrication of an optical fiber, whether single-mode or multi-mode, begins with a preform. The preform is a silica-based structure that typically has a doped core region. The preform is then "pulled" to form the much thinner optical fiber.

The techniques for the fabrication of multi-mode optical fiber preforms have generally followed the processes used in single mode optical fiber preform fabrication. These techniques, and their drawbacks, are explained in the following.

MCVD (Modified Chemical Vapor Deposition) is an internal process in which many layers are added to form a graded refractive index (ideally with a parabolic profile in the refractive index.) This ideal profile for a multi-mode fiber is schematically illustrated in FIG. 1. It is this profile that provides the required high bandwidth fiber, with the bandwidth being significantly larger than that of a multi-mode step index fiber. However, current and future Local Area Networks (LANs) will require even wider bandwidths and, as a result, the step index, or rod in tube techniques, for fabricating preforms will not be adequate. If a single mode fiber is desired, a MCVD preform can be made, and the preform can be sleeved with a large thick walled tube. This permits many hundreds of kilometers of optical fiber to be pulled from a single MCVD preform, and thus makes MCVD competitive with other processes to be described below. However, this sleeving cannot be used for multi-mode fibers, since the multi-mode fiber core is typically significantly larger than the core of a single mode fiber, e.g., 50 microns to 62.5 microns for a 125 micron outer diameter, which can be an order of magnitude larger that the single mode fiber core. Such a large core cannot be built up with a sleeving that is designed to increase the amount of fiber pulled from a single, larger diameter preform.

OVD (Outside Vapor Deposition) is a process by which silicon tetrachloride (or, more recently, the vapors of a suitable organic precursor as described in U.S. Pat. No. 5,043,002 entitled "Method of Making Fused Silica by Decomposing Siloxanes" to Dobbins et al.) and oxygen are combusted to form silica soot that impinges on a slightly tapered mandrel. The soot deposition builds up on this "bait rod", and there is no limitation on the diameter of the final soot body. The "bait rod", typically a tapered alumina rod, is removed, and the soot body is then sintered in a chlorine environment to form a vitreous, pore-free preform. The preform is then stretched to achieve the desired geometry and subsequently pulled into an optical fiber. This has proven to be a very successful method for the fabrication of single mode fibers that require only a small amount of germanium dioxide in the core of the fiber, and large amounts of lightly doped silica around the core. However, and as was discussed above, for a graded index multi-mode fiber an ideally parabolic profile is required to achieve a wide bandwidth.

Since it is possible, in principle, to make large core soot bodies using outside deposition, one might think that this is an ideal technique for the low cost manufacture of low loss, high bandwidth multi-mode fiber preforms. Unfortunately, this is not the case for the following reason. Even though a proper radial gradation in the germanium content of an unsintered soot boule can be achieved; in the sintering process, especially in the presence of chlorine, the germanium dioxide undergoes a reaction to form the germanium oxide, which has a considerable vapor pressure at the sintering temperatures that are required to form an amorphous preform. Thus, the needed parabolic gradation in the refractive index cannot be achieved. This is because of the fact that germanium is used, and the germanium chemistry destroys the incorporation of germanium dioxide at high temperatures.

It is noted that the use of non-chlorine containing precursors is described in U.S. Pat. No. 4,501,602 to Miller et al., wherein the precursors used in a vapor phase process do not contain chlorine.

Vapor Axial Deposition (VAD) is another technique for the fabrication of multi-mode preforms, and has the advantage that large soot boules can be made. However, with germanium dioxide as the index raising component it is difficult to maintain the desired parabolic profile during sintering, as was described previously for the OVD case.

It should be noted that in all of the fiber fabrication processes, discrete layers of doped glass are deposited. Since Ge is a glass former incorporated into the silica network, it does not readily diffuse, even at high temperatures. Thus, the mechanism of diffusion, which would smooth the boundaries between layers, is absent.

A brief reference is also made to a relatively new technology that is based on plastic fiber. However, this process is not yet technically mature.

Another current problem in the industry is an inability to fabricate up-doped silica preform tubes for cladding pumped optical fiber lasers.

OBJECTS AND ADVANTAGES OF THE INVENTION

It is a first object and advantage of this invention to provide an improved method for fabricating a preform suitable for use as a multi-mode optical fiber precursor.

It is a second object and advantage of this invention to provide a method to fabricate an up-doped silica preform tube for use in making a cladding pumped optical fiber laser.

It is another object and advantage of this invention to provide an improved method for fabricating a preform suitable for use in manufacturing a wide bandwidth multi-mode optical fiber, the method employing a liquid phase spray pyrolysis technique for generating silica soot at a high rate, in combination with non-chlorine containing liquid chemical precursors and a refractory, index of refraction raising additive that overcomes the problems inherent in the use of germanium-based chemistry at typical sintering temperatures.

It is one further object and advantage of this invention to provide a method to fabricate an all-glass cladding pumped optical fiber.

SUMMARY OF THE INVENTION

The foregoing and other problems are overcome and the objects of the invention are realized by methods and apparatus in accordance with embodiments of this invention.

A method is disclosed for fabricating a preform suitable for use in manufacturing a wide bandwidth multi-mode optical fiber. The method includes steps of employing a liquid phase spray pyrolysis technique for generating silica soot at a high rate, in combination with a non-chlorine containing liquid silica precursor and a refractory, index of refraction raising additive that overcomes the problems inherent in the use of germanium-based chemistry at typical sintering temperatures. The refractory, index of refraction raising additive is preferably comprised of a Group V (Group VB) element oxide, such as a tantalum oxide. The liquid precursor is preferably comprised of a polymethylsiloxane, such as hexamethyldisiloxane, octamethylcyclotetrasiloxane (OMCCTS), or tetramethylcyclotetrasiloxane.

The step of employing a liquid phase spray pyrolysis technique includes the steps of: (a) merging at least two liquid streams, one comprised of the liquid silica precursor and another one comprised of the liquid silica precursor in combination with the index of refraction raising additive; (b) atomizing, spraying and then combusting the merged streams to form a flame that generates silica soot that contains the additive; and (c) varying the flow rate of at least one of the streams in order to vary a concentration of the additive in the silica soot.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

In a first aspect this invention provides a high rate liquid precursor delivery system suitable for use in OVD. Instead of using vapor precursors, as is typically done, the teaching of this invention is instead directed to the combustion of a finely divided aerosol of combustible organic liquids. The preferred liquid precursors, sometimes referred to as "feedstocks", may be generally denoted as polymethylsiloxanes, as described in the above-referenced U.S. Pat. No. 5,043,002 entitled "Method of Making Fused Silica by Decomposing Siloxanes" to Dobbins et al. Typical examples of such liquids are hexamethyl di-siloxane, octamethylcyclotetrasiloxane (OMCCTS), and tetramethylcyclotetrasiloxane. These compounds, upon combustion, produce 0.75 gm (or more) of silica per gm of liquid precursor. In comparison, silicon tetrachloride, upon combustion, produces only 0.274 gm of silica. It will be noticed that these exemplary preferred liquid precursor compounds are halide-free, and are thus environmentally "friendly". They can also be stored easily. Since these precursors are used extensively in the silicone industry, the cost is competitive with silicon tetrachloride.

While it is known to use the vapors of such compounds, as in the above-referenced U.S. Pat. No. 5,043,002, for silica production for OVD, in the instant invention a liquid aerosol is used instead. The liquid aerosol is characterized by a population of droplets having a maximum diameter in a range of about 10 microns to about 20 microns. The use of droplets is thus distinguished from the conventional vapor techniques, where essentially molecular-sized reactant is employed.

Figure 2:
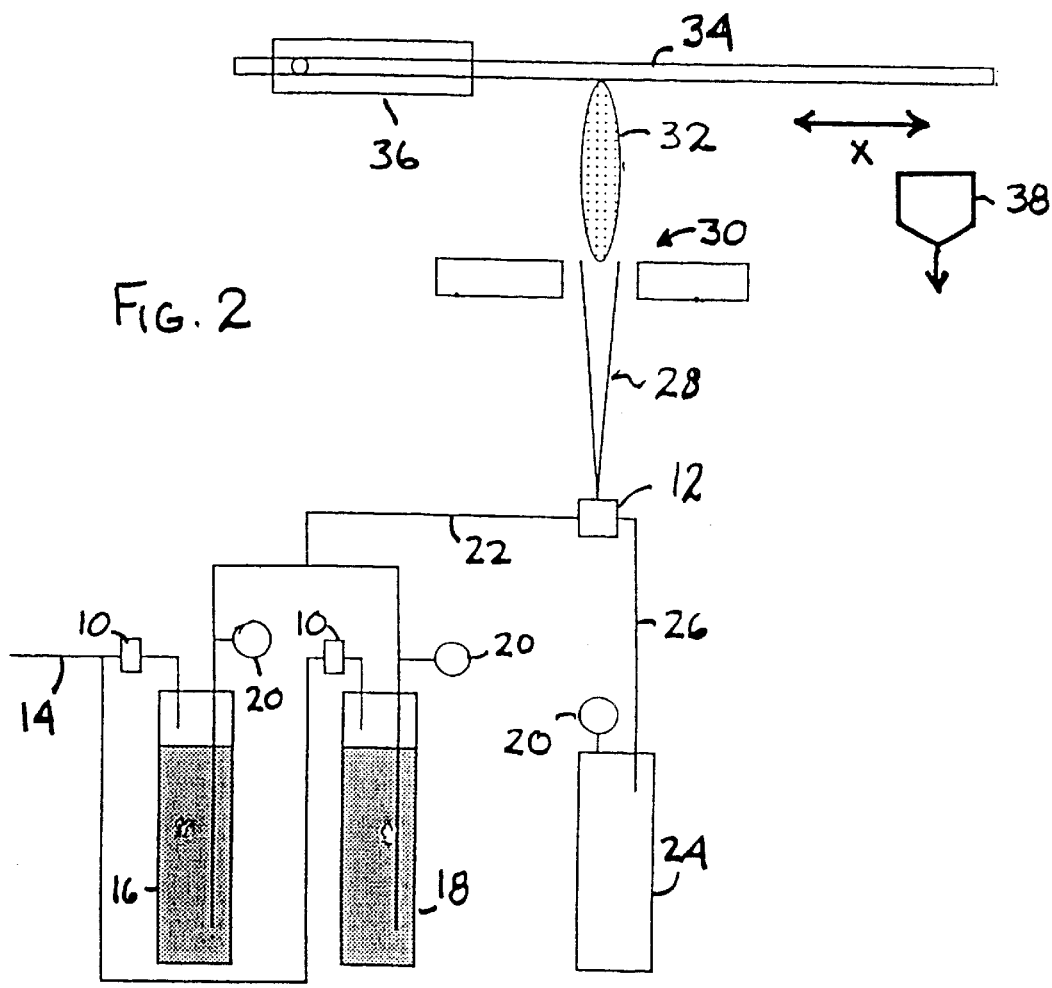
FIG. 2 is a block diagram of a spray pyrolysis system, in accordance with an aspect of this invention, that is suitable for use in practicing an Outside Vapor Deposition (OVD) methodology.

The liquid aerosol can be formed by several techniques. For a high deposition rate process in accordance with this invention it is preferred to use a spray nozzle 12 in an OVD configuration as shown in FIG. 2, which is explained in greater detail below. With such an arrangement, it has been found that one can readily produce more than 50 gm/min of Si from a single nozzle. This is significantly more than either the conventional OVD or VAD processes can provide using vapor delivery. The aerosol jet is sprayed through either an oxy hydrogen or a propane oxygen flame.

The resulting chemical reaction is vigorous, and there is significant noise produced from the flame. The soot that is produced contains small aerosol particles of silica that are deposited on a mandrel. Experiments have confirmed the vigor of the reaction, and the fact that the reaction goes to completion. The reaction products (in the undoped stream) are silica, water, and carbon dioxide.

It is noted that U.S. Pat. No. 5,110,335, entitled "Method of Glass Soot Deposition Using Ultrasonic Nozzle" by Miller et al. describes the use of an ultrasonic nozzle to atomize or produce a mist from a liquid reactant (silicon tetrachloride or tetraethylorthosilicate). The resulting droplet diameter is said to be approximately 20 to 50 microns, The relatively low velocity of the atomized liquid (typically 0.2 to 0.4 meters per second) is further said to contribute to a high rate of deposition (35% higher than a conventional deposition using a carrier gas).

However, the inventor has determined that this low velocity of the atomized liquid is not advantageous. Furthermore, the inventor has determined that significantly improved deposition rates can be achieved by the use of a high velocity droplet spray of the above-referenced polymethylsiloxanes, such as hexamethyldisiloxane, octamethylcyclotetrasiloxane (OMCCTS), and tetramethylcyclotetrasiloxane.

The advantages of low loss are well established for single mode, long haul fibers. However, in multi-mode fibers the lengths are much shorter, often less than one kilometer, and reasonable tradeoffs can be made in order to achieve the necessary high bandwidth at the expense of a somewhat higher loss.

Figure 1:
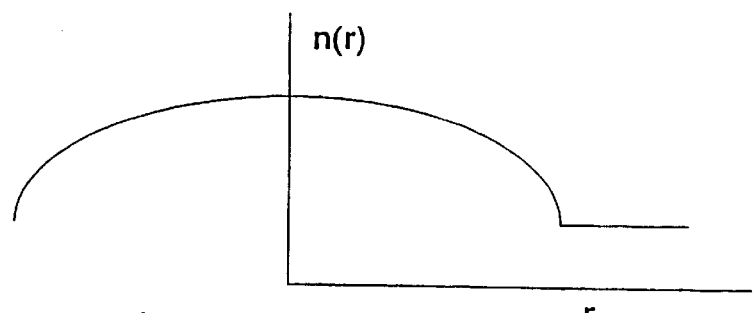
FIG. 1 is a graph that illustrates an ideal parabolic index of refraction (n) profile, as a function of fiber radius (r), for a multi-mode optical fiber.

It has thus been demonstrated that it is possible to produce a high quality, large soot boule using the spray pyrolysis technique in accordance with this invention. In accordance with a further aspect of this invention, an important consideration is to provide a technique to also grade the index of refraction. The ideal goal is to provide the parabolic index profile shown in FIG. 1.

A presently preferred index raising additive material is an oxide, in particular a Group VB metal oxide. The presently preferred material to use as the index raising additive contains tantalum oxide, although the teachings of this invention are not limited to only this particular material, nor is the teaching limited to the use of only Group VB materials, such as vanadium and niobium.

It has been determined that tantalum oxide can produce a single mode fiber with a loss of about 2 dB/km at 1550 nm. It has now been demonstrated that tantalum oxide is also an advantageous material for use in grading the index of refraction of a multi-mode optical fiber preform. Tantalum oxide has several advantages over conventionally used materials. First, there are no absorption bands in the infrared near the commonly used telecommunications wavelengths (e.g., 1.3 microns and 1.5 microns). Second, since it is a refractory material, it does not "burn off", as does germanium dioxide, during the sintering process. Third, it has a high refractive index. This being the case, and even with a cost that may be somewhat higher than germanium, relatively less of the tantalum material is needed to produce a multi-mode preform.

The problems of germanium "burn off" are not present with tantalum, so that the distribution that occurs in the unsintered soot boule should also be present in the final preform. Although there will be larger water losses, since the sintering does not occur in a chlorine atmosphere, this is not necessarily a drawback. This is true because solution doped optical fiber preforms (MCVD) can be dried only with oxygen.

In practice, two canisters pressurized with dry nitrogen can be used as the source of liquid precursor for the spray nozzle. In one canister is placed only the silica precursor, for example, hexamethyl di siloxane. In the other canister there is dissolved, in the silica precursor, tantalum ethoxide, or tantalum methoxide, or some other suitable index raising material. These two liquid streams are caused to merge just before the spray nozzle. Initially, the liquid containing both the Ta and Si precursors is sprayed and combusted. As the soot boule increases in diameter the flow of liquid from the tantalum-containing canister is gradually reduced and is replaced by the flow from the canister that contains only the silica precursor. Alternatively, the flow rate from the canister that contains only the silica precursor can be increased, or both flow rates can be adjusted.

In any event, by varying the flow rates of the liquid streams it is possible to grade the refractive index of the soot boule, thus making it possible to fabricate relatively low loss, high bandwidth multi-mode optical fiber preforms.

One significant advantage of this technique is that the high flow rates of the aerosol process are combined with the large boule size of the OVD, and the chemistry is such that grading the index of refraction can be readily achieved.

Referring now to FIG. 2, in an exemplary apparatus for multi-mode preform fabrication a plurality of pumps may be used to deliver reactant gases and liquids to an aerosol nozzle 12, or a pressurized vessel may be used to deliver the reactant stream. The spray nozzle 12 may be a commercially available item, such as a unit obtained from Spraying Systems Co., who are represented by Sowden Associates of Manchester, N.H. In the illustrated configuration a gas line 14 carries dry nitrogen into tanks 16 and 18 through valves 10. The tank 16 contains the silica precursor, which may be, by example, octamethylcyclotetrasiloxane, or hexamethyldisiloxane, or a similar organic compound with more than one Si atom. In tank 18 is contained the same liquid precursor plus an additive, such as tantalum ethoxide that is dissolved in the precursor for Si. A computer (not shown) controls valves 20 to control the mixture ratio such that it is possible to change the amount of additive for varying the index of refraction profile as the preform grows in radius. A line 22 carries the reactants to the spray nozzle 12. Tank 24 contains pressurized oxygen that is fed into the spray nozzle 12 through line 26 to atomize the liquid precursors. The atomized liquids emanate from the nozzle 12 in the form of a fine spray 28. The particle droplets are small, of the order of 10–20 microns, so that they are intimately mixed with the oxygen from the tank 24. The spray 28 then traverses a burner 30, such as an oxy-hydrogen or an oxy-propane burner. At this point, a vigorous reaction occurs to produce a sheet of flame 32 that contains silica, doped silica, carbon dioxide, water, and excess oxygen. The reaction goes to completion quickly. The amorphous particles are collected on a rotating rod 34 that has a slight taper so that it can ultimately be easily removed. A quartz sleeve 36 fits over the end of the rod 34 and the deposition covers the rod 34. The quartz sleeve 36 is subsequently used to hang the soot preform for sintering in a vertical furnace (not shown). The rod 34 is translated back and forth along the axis designated X so that the length of the rod is covered with the silica and doped silica particles. Mass flow controllers 38 provide feedback so that the amounts of liquid precursor from tanks 16 and 18, and the amount of oxygen from tank 24, can be controlled with valves 20 to provide the desired index gradation.

In the foregoing embodiment the liquid precursor tanks 16 and 18 may be pressurized within a range of about 10 psi to about 40 psi, and may exhibit a flow rate in the range of about 0.7 grams/sec to about 3 grams/sec. The pressure of the oxygen from tank 24 may be in the range of about 10 psi to about 30 psi. A suitable orifice diameter for the spray nozzle 12 may be about 2 mm. These pressures and flow rates, and the nozzle orifice diameter as well, are exemplary, and should not be construed as a limitation upon the practice of this invention.

In the foregoing embodiment it becomes possible to grade the refractive index by varying the amount of index raising material as the radius of the preform increases. As an example, tantalum butoxide in a polymethyl poly siloxane precursor can be used to produce a silica containing the index raising tantalum oxide.

In a further embodiment of this invention an unsintered soot preform is fabricated in which the tantalum oxide is uniformly distributed as a function of radius. A subsequent sintering step in an atmosphere containing a small amount of chlorine then accomplishes two purposes. First, the addition of chlorine is effective in reducing the water content of the preform. Second, the chlorine converts some portion of the tantalum oxide to the chloride. The chloride has a high vapor pressure at relatively low temperatures, and since the sintering and chemical reaction proceeds from the outside to the center of the preform, more of the tantalum oxide would be preferentially removed at larger radii, thus resulting in the desired parabolic or substantially parabolic distribution of index raising dopant. When done in a controlled manner this process will produce a smoothly graded refractive index in the final consolidated preform.

In summary, using the combustion of liquid organic precursor droplets from a spray nozzle, high deposition rates in an OVD process can be achieved. By not using germanium as the index raising element, problems with "burn off" and associated loss of the parabolic profile can be avoided. Relatively low loss, high bandwidth, large diameter soot boules can be obtained in this manner.

The foregoing has described a novel method for the fabrication of multimode optical fiber preforms using an aerosol spray technique with poly-methyl poly siloxane is compounds. By doping with, by example, a Group V ion such as Ta, one can increase the index of refraction.

It is now pointed out that another potential important application for this method is in the fabrication of optical fiber substrate tubes for cladding pumped optical fiber lasers.

In a cladding pumped optical fiber, a rare earth doped single mode core is deposited within a substrate tube. The substrate tube is collapsed and, when pulled, the polymeric material of the outer cladding is of low refractive index. Diode light can be pumped into the part of the fiber (which is multimode) drawn from the substrate tube. The light is guided down the substrate tube (due to the low refractive index of an outer polymer) and ultimately is absorbed by the single mode rare earth doped core.

If a high index of refraction substrate tube were available, then a silica cladding, or a silica-fluorine down-doped outer cladding, could be used to form an all-glass cladding pumped fiber laser.

In accordance with this aspect of the invention, by depositing an up-doped silica soot on a mandrel, it becomes possible to fabricate a substrate tube with a refractive index high enough so that the structure can, in turn, be over-clad with either silica or fluorine down-doped silica. This will produce an all-glass cladding pumped fiber.

It is also within the scope of the teaching of this invention to take a thin walled silica tube, and then overclad the tube with an up-doped silica soot. The resulting structure is then overclad with a lower index glass. The result is the production of a substrate tube inside of which a rare earth can be deposited to form a single mode fiber laser.

This solves the current problem of an inability to fabricate up-doped silica preform tubes for cladding pumped optical fiber lasers.

While the invention has been particularly shown and described with respect to preferred embodiments thereof, it will be understood by those skilled in the art that changes in form and details may be made therein without departing from the scope and spirit of the invention.

What is claimed is:

1. A method for fabricating a preform, comprising steps of:

operating a liquid phase spray pyrolysis technique for generating silica soot, in combination with a non-chlorine containing liquid silica precursor and a refractory, index of refraction raising additive;

the step of operating comprising merging at least two liquid streams, one comprised of the liquid silica precursor and another one comprised of the liquid silica precursor in combination with the index of refraction raising additive;

atomizing, spraying and combusting the merged streams to form a flame that generates silica soot that contains the additive; and varying a flow rate of at least one of the streams in order to vary a concentration of the additive in the silica soot.

2. A method as in claim 1, wherein the refractory, index of refraction raising, additive is comprised of a Group VB element oxide.

3. A method as in claim 1, wherein the refractory, index of refraction raising additive is comprised of tantalum.

4. A method as in claim 1, wherein the liquid precursor is comprised of a polymethylsiloxane.

5. A method as in claim 4, where said polymethylsiloxane is comprised of hexamethyldisiloxane.

6. A method as in claim 4, where said polymethylsiloxane is comprised of octamethylcyclotetrasiloxane (OMCCTS).

7. A method as in claim 4, where said polymethylsiloxane is comprised of tetramethylcyclotetrasiloxane.

8. A method as in claim 1, wherein the concentration is varied to obtain a substantially parabolic index of refraction profile in the preform.

9. A method as in claim 1, wherein the refractory, index of refraction raising additive is comprised of a Group VB element.

10. A method as in claim 1, where the concentration is varied to provide substantially an index of refraction that varies in a substantially parabolic manner over a radius of said preform.

11. A method as in claim 1, further comprising sintering the preform.

12. A method as in claim 1, further comprising sintering the preform in an atmosphere that is substantially free of chlorine.

13. A method as in claim 1, further comprising pulling the preform to form an optical fiber.

14. A method as in claim 1, further comprising pulling the preform to form a multi-mode optical fiber.

* * * * *